United States Patent Office 3,527,755
Patented Sept. 8, 1970

3,527,755
PROCESS FOR THE PRODUCTION OF
PYRIDOXAL PHOSPHATE
Masuo Murakami, Tokyo, Masaru Iwanami, Yokohama, Kanagawa, and Toshiko Numata, Tokyo, Japan, assignors to Yamanouchi Pharmaceutical Co., Ltd., Tokyo, Japan
No Drawing. Continuation of application Ser. No. 371,744, June 1, 1964. This application June 6, 1968, Ser. No. 739,937
Claims priority, application Japan, Aug. 12, 1963, 38/42,464, 38/42,470; Feb. 3, 1964, 39/5,208
Int. Cl. C07d 31/28
U.S. Cl. 260—240
7 Claims

ABSTRACT OF THE DISCLOSURE

The objective of this invention is to prepare pure pyridoxal phosphate:

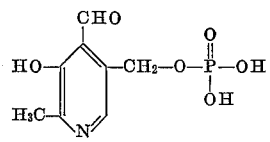

from the corresponding Schiff base:

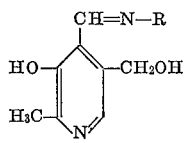

wherein R is phenyl, benzyl, phenethyl, chlorophenyl, lower alkylphenyl or lower alkoxyphenyl without entailing prior art defects. The secret is the phosphorylation of the Schiff base whereby, unexpectedly, the pure phosphoric acid ester:

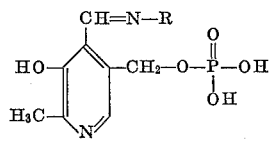

is obtained. Hydrolysis of the latter yields the desired pure pyridoxal phosphate.

---

This application is a streamlined continuation of Ser. No. 371,744, now abandoned.

The present invention relates to a process for producing pyridoxal phosphate by using a pyridoxal Schiff base as the raw material.

Hitherto, as a process for the production of pyridoxal phosphate, various processes have been known.

In the first place, U.S. Pat. No. 2,703,323 discloses a process for the preparation of pyridoxal phosphate by reacting pyridoxal with hydroxylamine or hydrazine to provide a masking group to protect the aldehyde group of the pyridoxal, then phosphorylating the thus-protected compound with meta-phosphoric acid, and then acid-hydrolyzing the resultant 5'-triphosphoric acid ester to remove the grouping protecting the aldehyde group, while liberating 2 mols of orthophosphoric acid. For purification and isolation purposes, the pyridoxal-5'-phosphoric acid ester is converted into the form of a salt, such e.g. as the calcium salt or magnesium salt.

However, the above process is complicated in procedure and does not give satisfactory results, inter alia because the pyridoxal is not obtained as such, as is set forth in British Pat. No. 880,595 (page 1, left column, lines 38–40).

However, the above process is complicated in procedure as stated above and pyridoxal phosphate is not obtained as its own form.

Then, in the process of British Pat. No. 880,595 wherein pyridoxal oxazolidine prepared by reacting pyridoxal with β-aminoalcohol instead of hydroxylamine or hydrazine is used as the raw material, the oxazolidine bond and polyphosphate bond can be easily hydrolyzed by a diluted mineral acid without using nitrous acid, etc., but in order to separate pyridoxal phosphate from the large quantity of inorganic materials mixed in the products, an ion-exchange resin must be used.

Moreover, there is described in the specification of the British patent that as the aminoalcohol, expensive ephedrine is practically most desirable.

Further, there has been known a process (J.A.C.S.; 76, 169 (1954)) wherein pyridoxamine phosphate is directly oxidized and a process (U.S. Pat. No. 2,755,284) wherein an alkali metal salt of pyridoxamine phosphate and pyruvic acid are subjected to a transamination using a water-soluble salt of a metal such as copper or cobalt.

In these processes, in order to separate pyridoxal phosphate in its pure form, a process must be employed in which a diluted aqueous solution of pyridoxal phosphate obtained by passing through a cation-exchange resin a solution of the products from the final step and eluting with water is concentrated at a low temperature. But, such a separating and refining process is industrially unprofitable from an economical viewpoint.

The inventors have found, as the results of the investigations for producing pure pyridoxal phosphate without being accompanied by the above drawbacks, that high-purity pyridoxal phosphate is produced easily by phosphorylating a pyridoxal Schiff base prepared by the condensation of an aqueous pyridoxal mineral acid salt solution and an organic amine with a phosphorylating agent, preferably a mixture of orthophosphoric acid and phosphorus pentoxide, hydrolyzing thus obtained poly phosphate solution under acidic conditions and adjusting the pH of this solution to about 2 to 4 to separate a pyridoxal phosphate Schiff base, and then hydrolyzing the latter under alkaline conditions to separate pyridoxal phosphate.

This process is shown by the following chemical reaction formula:

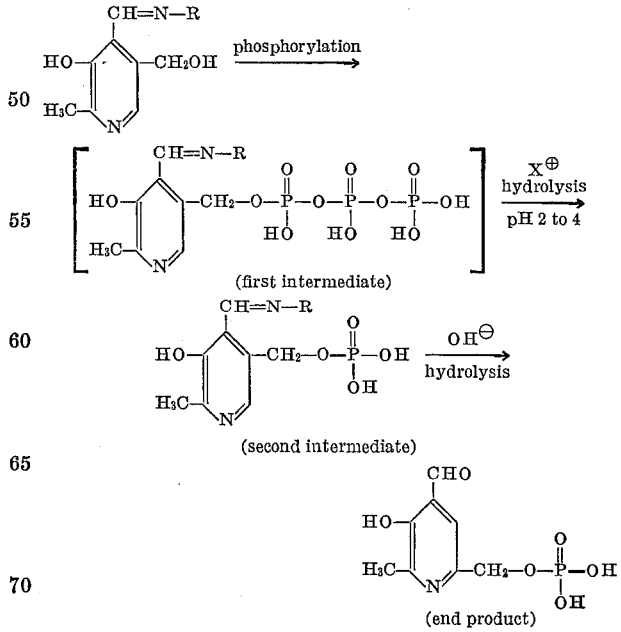

wherein R is phenyl, benzyl or phenethyl, or any one of these substituted with halogen, lower alkyl or lower alkoxy.

The process of this invention is an extremely profitable one in industry from the standpoint that a novel material, pyridoxal phosphate Schiff base, can be very easily separated in its pure form from the hydrolysis product of the phosphate by adjusting the pH of the hydrolyzed product solution to about 2 to 4.

Moreover, as the hydrolysis of the pyridoxal phosphate Schiff base is carried out under alkaline conditions in the process of this invention, there are merits that the phosphoric acid ester is not decomposed as well as that the by-produced amine can be immediately removed by extracting with an organic solvent.

In the process of this invention, as the intermediate product, pyridoxal phosphate Schiff base, can be obtained in a very pure state, pyridoxal phosphate produced by the hydrolysis of the intermediate product is also very pure. Hence, industrially unprofitable procedures as in conventional processes, such as the cation-exchange resin treatment followed by the low-temperature concentration of the diluted aqueous solution, etc., are unnecessary.

Representative of amines which can be employed to provide the R—N= moiety in the starting Schiff bases are e.g. p-phenetidine, o-phenetidine, o-anisidine, p-toluidine, p-chloroaniline, aniline, benzylamine, phenethylamine, etc.

A process for producing a Schiff base from an organic amine and an aldehyde is described in J.A.C.S.; 70, 3669–3671 (1948) in which pyridoxal is used in the free form. When the inventors followed this process, it has been found that the pyridoxal Schiff base can be very profitably obtained by adding in 1 mole of a mineral acid salt of pyridoxal as an aqueous solution 1–2 equivalents of a mineral acid salt of the organic amine and then neutralizing with an alkali. Therefore, as a matter of course, an oxidation product of the hydrochloride of vitamin $B_6$ can be used as it is as the mineral acid salt of pyridoxal.

As the various phosphorylating agents that can be used in the process of this invention, there are a mixture of orthophosphoric acid and phosphorus pentoxide; metaphosphoric acid; a mixture of phosphorus oxychloride and water; a mixture of phosphorus pentoxide and water; etc.

In the case of using a mixture of orthophosphoric acid and phosphorus pentoxide (1–2:1 in weight ratio), 1 mole of a pyridoxal Schiff base is dissolved in 10–20 moles of the mixture and the solution is heated for 2–20 hours at about 30–80° C.

Further, in the case of using phosphorus oxychloride and water, 1 mole of a pyridoxal Schiff base is caused to react with 10–20 moles of phosphorus oxychloride and water (1:1 in mole ratio) with stirring under cooling.

Furthermore, in the case of using phosphorus pentoxide and water (4–5:1 in weight ratio), 1 mole of a pyridoxal Schiff base is dissolved in 10–20 moles of the mixture of phosphorus pentoxide and water, and the solution is heated for 2–20 hours at about 30–80° C.

Among the above cases, the case of using phosphoric acid and phosphorus pentoxide is most preferable.

Thus obtained poly-phosphate is hydrolyzed by diluted hydrochloric acid and the pH of the hydrolyzed solution is adjusted to 2–4 preferably to 3 by adding an alkali carefully with stirring under cooling. If an aliphatic amine is used, the pH of the solution is adjusted to 2–4 after removing phosphoric acid ions by barium phosphate by adding barium hydroxide to the solution. By such a treatment the pyridoxal phosphate Schiff base can be obtained as the precipitates.

The pyridoxal phosphate Schiff base is then dissolved in a concentrated caustic alkali solution (preferably in about a 2 N sol.) of about 5 times as much as the volume of the Schiff base to hydrolyze the Schiff base, formed organic amines in the hydrolysis are removed by using an organic solvent, such as ether, dichloroethane, chloroform, etc., and the remaining aqueous phase is neutralized with a mineral acid in a volume corresponding to that of the used caustic alkali, whereby the final product, pyridoxal phosphate is crystallized in an extremely pure form.

Thus obtained pyridoxal phosphate can be used as a material having the enzyme effect of vitamin $B_6$ useful as medicines used for curing various dermatitises, pellegra, morning sickness, liver troubles and the like.

The invention will be further explained in detail by the following preferred examples:

EXAMPLE 1

(a) Into 40 ml. of a mixture of 85% orthophosphoric acid and phosphorus pentoxide (1.1:1 in weight ratio) was dissolved 4.0 g. of pyridoxylidene-p-toluidine and the solution was heated for 6 hours at 45° C. Thus obtained reaction product was hydrolyzed for 15 minutes at 60° C. with the addition of 40 ml. of 0.1 N hydrochloric acid. By adjusting the pH of the solution obtained by the hydrolysis to 3 with the careful addition of 120 ml. of 50% sodium hydroxide with stirring under cooling, 4.09 g. of pyridoxylidene-p-toluidine phosphate was obtained. The yield was 82% and the result of the elementary analysis of the product was shown in the following table.

$C_{15}H_{17}N_2O_5P$ (MW=336). Calcd. (percent): C, 53.57; H, 5.06; N, 8.34. Found (percent): C, 53.53; H, 5.29; N, 8.19.

(b) 2.0 g. of thus obtained pyridoxylidene-p-toluidine-phosphate was dissolved into 10 ml. of a 2 N sodium hydroxide solution, after removing liberated amines by the extraction with chloroform, 10 ml. of 2 N hydrochloric acid was added in the aqueous layer, and the system was stored in cold for a day. Then, the precipitated pyridoxal phosphate was separated by filtering, washed with ethyl alcohol, and dried. The amount of the final product was 1.12 g. and the yield was 74.7%.

EXAMPLE 2

Into 30 ml. of a mixed solution of 85% orthophosphoric acid and phosphorus pentoxide (1.1:1 in weight ratio) was dissolved 3.0 g. of pyridoxylidene-p-phenetidine and the solution was treated as in (a) of Example 1 to afford 3.1 g. of pyridoxylidene-p-phenetidine phosphate. The yield was 77%.

Ultraviolet absorption value: Molar extinction coefficient 388 m$\mu$ (0.1 N NaOH soln.)=6680.

*Elementary analysis.*—$C_{16}H_{19}N_2O_6P$ (MW=366). Calcd. (percent): C, 52.46; H, 5.19; N, 7.65. Found (percent): C, 52.44; H, 5.29; N, 7.48.

2.0 g. of thus obtained pyridoxylidene-p-phenetidine phosphate was dissolved into 10 ml. of 2 N sodium hydroxide and the solution was treated in accordance with process (b) of Example 1 to give 0.98 g. of pyridoxal phosphate (yield 71.0%).

Similarly, by dissolving 3.0 g. of pyridoxylidene-o-anisidine in 30 ml. of a mixed solution of 85% orthophosphoric acid and phosphorus pentoxide (1.3:1 in weight ratio), reacting them for 8 hours at 40° C., and treating the product as in (a) of Example 1, 3.2 g. of pyridoxylidene-o-anisidine phosphate was obtained with the yield of 78.5%. The result of the elementary analysis is shown in the following table:

*Elementary analysis.*—$C_{15}H_{17}N_2O_6P$ (MW=352). Calcd. (percent): C, 51.20; H, 4.86; N, 7.94. Found (percent): C, 50.17; H, 4.94; N, 7.62.

By treating 2.0 g. of the pyridoxylidene-o-anisidine phosphate as in process (b) of Example 1, 1.09 g. of pyridoxal phosphate was obtained with the yield of 76.0%. Similarly, when 1.0 g. of pyridoxylidene-o-phenetidine was treated as in (a) of Example 1, 1.24 g. of pyridoxylidene-o-phenetidine phosphate was obtained. The yield was 92%.

*Elementary analysis.*—$C_{16}H_{19}N_2O_6P$ (MW=366). Calcd. (percent): C, 52.46; H, 5.19; N, 7.65. Found (percent): C, 52.02; H, 5.19; N, 7.38.

EXAMPLE 3

(a) Into 10 ml. of a mixture of 85% orthophosphoric acid and phosphorus pentoxide (1.1:1 in weight ratio) was dissolved 1.0 g. of pyridoxylidene aniline and the solution was heated for 6 hours at 45° C. The obtained reaction product was hydrolyzed for 15 minutes at 60° C. with the addition of 10 ml. of 0.1 N hydrochloric acid.

By adjusting the pH of the solution obtained in the hydrolysis to 3 by adding carefully 30 ml. of 50% sodium hydroxide with stirring under cooling, 0.92 g. of pyridoxylidene aniline phosphate was obtained with the yield of 68.0%.

Elementary analysis.—$C_{14}H_{15}N_2O_5P$ (MW=322). Calcd. (percent): C, 52.17; H, 4.65; N, 8.70. Found (percent): C, 51.90; H, 4.82; N, 8.23.

(b) 0.9 g. of the pyridoxylidene aniline phosphate was dissolved into 5 ml. of 2 N sodium hydroxide, liberated amine was extracted off with ether and the remaining aqueous phase was stored in cold for a day with the addition of 5 ml. of 2 N hydrochloric acid to precipitate pyridoxal phosphate, which was separated by filtering, washed with acetone and dried. The amount of the final product was 0.52 g. and the yield was 70.2%.

EXAMPLE 4

(a) Into 10 ml. of a mixture of 85% orthophosphoric acid and phosphorus pentoxide (1.1:1 in weight ratio) was dissolved 1.0 g. of pyridoxylidene-p-chloroaniline and the solution was heated for 8 hours at 45° C. By treating the product in accordance with process (a) of Example 1, 0.7 g. of pyridoxylidene-p-chloroaniline phosphate was obtained. The yield was 51.2% and the result of the elementary analysis is shown in the following table:

Elementary analysis.—$C_{14}H_{14}N_2O_5PCl$ (MW=356.5). Calcd. (percent): C, 47.10; H, 3.96; N, 7.85. Found (percent): C, 46.91; H, 4.01; N, 7.65.

(b) 2.0 g. of the pyridoxylidene-p-chloroaniline phosphate was dissolved into 10 ml. of 2 N sodium hydroxide and the solution was treated as in the case of (b) of Example 1 to give 0.89 g. of pyridoxal phosphate. The yield was 63.0%.

EXAMPLE 5

Into 30 ml. of a mixture of 85% orthophosphoric acid and phosphorus pentoxide (1.1:1 in weight ratio) was dissolved 3.0 g. of pyridoxylidene benzylamine and the solution was heated for 18 hours at 56° C. By treating thus obtained product in accordance with process (a) of Example 1, 2.5 g. of pyridoxylidene benzylamine phosphate was obtained with yield of 60.5%.

Elementary analysis. — $C_{15}H_{17}N_2O_5P$ (MW=336). Calcd. (percent): C, 53.57; H, 5.06; N, 8.34. Found (percent): C, 52.78; H, 4.98; N, 8.46.

When 2.0 g. of the pyridoxylidene benzylamine phosphate was treated in accordance with process (b) of Example 1, 0.82 g. of pyridoxal phosphate was obtained with the yield of 62.0%.

Similarly, by treating 2.0 g. of pyridoxylidene phenethylamine with 20 ml. of a mixture of 85% orthophosphoric acid and phosphorus pentoxide (1.1:1 in weight ratio), 1.35 g. of pyridoxylidene phenethylamine phosphate was obtained. The yield was 53.0%.

Elementary analysis.—$C_{16}H_{19}N_2O_5P$ (MW=350). Calcd. (percent): C, 54.85; H, 5.43; N, 8.00. Found (percent): C, 54.33; H, 5.35; N, 7.89.

By treating 2.0 g. of the pyridoxylidene phenethylamine phosphate in accordance with process (b) of Example 1, 0.90 g. of pyridoxal phosphate was obtained with the yield of 59.3%.

EXAMPLE 6

(a) Into 10 ml. of a mixture of phosphorus pentoxide and water (5:1 in weight ratio) was dissolved 1.0 g. of pyridoxylidene-p-toluidine and the solution was treated in accordance with the process as in (a) of Example 1 to give 1.05 g. of pyridoxylidene-p-toluidine phosphate. The yield was 85% and the result of the phosphate was shown below:

Elementary analysis.—$C_{15}H_{17}N_2O_5P$ (MW=336). Calcd. (percent): C, 53.57; H, 5.06; N, 8.34. Found (percent): C, 53.58; H, 5.29; N, 8.49.

EXAMPLE 7

1.0 g. of pyridoxylidene-p-phenetidine was dissolved into metaphosphoric acid prepared by dehydrating 10 ml. of 85% orthophosphoric acid by heating it to 340° C. and the solution was heated for 6 hours at 45° C. By treating the product as in process (a) of Example 1, 1.0 g. of pyridoxylidene-p-phenetidine phosphate was obtained with the yield of 75%.

Elementary analysis.—$C_{16}H_{19}N_2O_6P$ (MW=366). Calcd. (percent): C, 52.46; H, 5.19; N, 7.65. Found (percent): C, 52.48; H, 5.28; N, 7.85.

EXAMPLE 8

Into 45 g. of phosphorus oxychloride was added slowly 5.3 g. of water by cooling with ice, and then kept at room temperature overnight.

The next day 5.0 g. of pyridoxylidene-p-toluidine was added to the reaction product. After stirring for three hours, 300 ml. of ether was added to the obtained reaction product. Thus separated oily product was dissolved in 50 ml. of water and hydrolyzed by heating for one quarter minute at 60° C. By adjusting the pH of the solution to 3 with the addition of 10% sodium hydroxide under cooling, 4.5 g. of pyridoxylidene-p-toluidine phosphate was obtained. The yield was 72%.

Elementary analysis and infra-red absorption of the compound were fully identical with those of the authentic sample obtained in Example 1.

What is claimed is:

1. A pyridoxal phosphate Schiff base of the formula

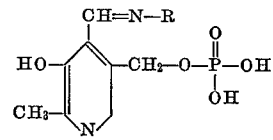

wherein R is a member selected from the group consisting of chlorophenyl, lower alkylphenyl and lower alkoxyphenyl.

2. A compound according to claim 1, namely, pyridoxylidene-p-chloroaniline phosphate.

3. A compound according to claim 1, namely, pyridoxylidene-p-toluidine phosphate.

4. A compound according to claim 1, namely, pyridoxylidene-o-phenetidine phosphate.

5. A compound according to claim 1, namely, pyridoxylidene-p-phenetidine phosphate.

6. A compound according to claim 1, namely, pyridoxylidene-o-anisidine phosphate.

7. In a process for the production of pure pyridoxal phosphate from the corresponding Schiff base of the formula

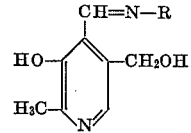

wherein R is a member selected from the group consisting of phenyl, benzyl, phenethyl, chlorophenyl, lower alkylphenyl and lower alkoxyphenyl, the improvement according to which the Schiff base is phosphorylated with a phosphorylating agent selected from the class consisting of a mixture of orthophosphoric acid and phosphorus pentoxide, metaphosphoric acid, a mixture of phosphorus oxychloride and water, and a mixture of phosphorus pentoxide and water to yield the corresponding compound of the formula

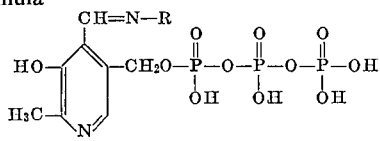

in solution as first intermediate and while retaining it in solution the latter is then diluted with dilute mineral acid selected from the group consisting of HCl, HBr, $HNO_3$ and $H_2SO_4$ and thereafter the pH is adjusted to about 2 to 4 with caustic alkali whereby two mols of orthophosphoric acid are selectively split off to yield as a precipitate the pure compound of the formula

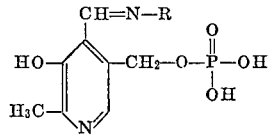

and finally subjecting the latter to alkaline hydrolysis to selectively convert the —C=N—R group to the —CHO group.

References Cited
UNITED STATES PATENTS 2,703,323  3/1955  Karrer et al. _____ 260—297

OTHER REFERENCES

Heyl et al., J. Am. Chem. Soc., vol. 70, pp. 3669 to 3671 (1948).

Heyl et al., J. Am. Chem. Soc., vol. 70, pp. 3430 to 3433 (1951).

Peterson et al., J. Am. Chem. Soc., vol. 76, pp. 169 to 170 (1954).

JOHN D. RANDOLPH, Primary Examiner

U.S. Cl. X.R.

260—297, 296; 424—263